(12) United States Patent
Rassi et al.

(10) Patent No.: US 8,968,816 B2
(45) Date of Patent: Mar. 3, 2015

(54) METHOD AND APPARATUS FOR MAKING CEREAL FLAKES

(75) Inventors: Barmack Rassi, Minneapolis, MN (US); Steven C Robie, Plymouth, MN (US); James N Weinstein, Maple Grove, MN (US)

(73) Assignee: General Mills, Inc., Minneapolis, MN (US)

( * ) Notice: Subject to any disclaimer, the term of this patent is extended or adjusted under 35 U.S.C. 154(b) by 40 days.

(21) Appl. No.: 13/372,977

(22) Filed: Feb. 14, 2012

(65) Prior Publication Data

US 2013/0209647 A1   Aug. 15, 2013

(51) Int. Cl.
*A23L 1/164* (2006.01)

(52) U.S. Cl.
USPC ........... 426/621; 426/620; 426/619; 426/618; 426/560; 426/516

(58) Field of Classification Search
USPC ................. 426/621, 620, 619, 618, 560, 516
See application file for complete search history.

(56) References Cited

U.S. PATENT DOCUMENTS

| | | | |
|---|---|---|---|
| 2,858,219 A | 10/1958 | Benson | |
| D203,657 S | 2/1966 | Benson | |
| D208,687 S | 9/1967 | Peden et al. | |
| 3,447,931 A | 6/1969 | Benson et al. | |
| 3,808,962 A | 5/1974 | Liepa | |
| 4,044,159 A | 8/1977 | Lutz | |
| D339,443 S | 9/1993 | Bielinski et al. | |
| 5,759,603 A * | 6/1998 | Francisco et al. | ............. 426/249 |
| 6,183,788 B1 | 2/2001 | Leusner | |
| 6,258,396 B1 | 7/2001 | Deutsch et al. | |
| 6,767,198 B2 | 7/2004 | Weinstein et al. | |
| 7,413,760 B2 | 8/2008 | Green et al. | |
| 7,585,532 B2 * | 9/2009 | Moore et al. | .................. 426/446 |
| 8,177,542 B2 * | 5/2012 | Groff et al. | ................ 425/382.3 |
| 2010/0055282 A1 | 3/2010 | Chatel et al. | |

FOREIGN PATENT DOCUMENTS

| | | |
|---|---|---|
| EP | 338239 | 10/1989 |
| EP | 2161118 | 3/2010 |
| WO | WO 1999/041998 | 8/1999 |

* cited by examiner

*Primary Examiner* — Lien T Tran
(74) *Attorney, Agent, or Firm* — Everett G. Diederiks, Jr.; Gregory P. Kaihoi

(57) ABSTRACT

Visually distinct, flaked Ready-to-Eat ("R-T-E") cereal products with varied texture and thickness are produced by forming a cereal dough and forcing the same through an extrusion die assembly including various spaced openings which establish a plurality of dough streams which are merged prior to reaching a die outlet. Directly at the die outlet, a resulting dough extrudate is sliced by a cutter unit to form dough discs which are then dried and cooled, during which the discs curl and form cereal flakes having varying textures defined, at least in part, by distinct sets of surface bumps. The number and configuration of the bumps can be altered by changing the number, shape and/or position of the various spaced openings of the die assembly, while the thicknesses of the resulting cereal flakes can be varied by just altering an operational speed of the cutter unit.

20 Claims, 3 Drawing Sheets

METHOD AND APPARATUS FOR MAKING CEREAL FLAKES

BACKGROUND OF THE INVENTION

The invention relates to food products and, more particularly, to a method and apparatus for making cereal flakes. In particular, the invention relates to the making of flakes for ready-to-eat breakfast cereals by extruding and cutting cooked cereal dough.

A wide variety of food products are prepared from cooked cereal doughs, especially ready-to-eat ("RTE") or breakfast cereals, as well as a variety of snack products. Generally in the preparation of the cooked cereal dough, cereal or farinaceous ingredients, such as various cereal flours, are first admixed with other dry ingredients such as salt, minerals, starch, sugars, to form a dry blend of ingredients and then is further blended with various liquid ingredients, including water, heated and worked to gelatinize or cook the starch fraction of the cereal ingredients and other starchy materials. A wide variety of blending, cooking and working apparatuses and techniques are well known.

More recently, the preparation of a cooked cereal dough using a cooker extruder, especially a twin screw extruder, has become commonplace. The cooked cereal doughs so prepared can be processed to form finished products of various size, textures, and shapes. Typically, a post, cooked cereal dough formation step involves forming suitably sized and shaped individual pieces and drying to form finished cereal base pieces, such as shreds, flakes, biscuits or puffs. Thereafter, the finished dried cereal base pieces can have a topical coating applied to provide desired taste and texture attributes. For instance, in the preparation of a breakfast cereal, the topical coating an include a sugar coating.

Of particular interest to the invention is the making of flake-type ready-to-eat (RTE) cereal products. A typical production arrangement is illustrated in FIG. 1 wherein various ingredients, such as a grain-based ingredient, syrup and water 2, 4 and 6 are blended together and cooked in an initial extruder 15 to form a cooked cereal dough 18. The cereal dough 18 can undergo additional cooking, if desired, in a downstream cooking vessel 22, prior to being formed into individual pellets 28 in a pelletizer 32. The pellets 28 are then dried in a dryer 36 to establish dried pellets 40. Thereafter, the dried pellets 40, which can also be otherwise conditioned, are converted into thin wet flakes 44 in a flaking or flake forming step wherein the pellets are directed through flaking roller 48. Thereafter, the wet thin flakes 44 are dried and optionally puffed at 52 and/or toasted at 56 prior to reaching a final cooling zone 58 to produce a final flaked cereal product 60.

Although very effective, this method of producing cereal flakes includes numerous steps, each having associated manufacturing structure. To minimize this structure, it has also been proposed to form cereal flakes by forcing extruded cereal dough through a slotted die and, after extruding a desired length of the dough, the extrudate is cut and dried as represented by U.S. Patent Application Publication 2010/0055282. Although minimizing the structure needed to produce flakes, this arrangement has various disadvantages, in particular the inability to readily vary thicknesses of the flakes. With this known art in mind, there is seen to exist a need in the art for an apparatus and method to produce cereal flakes with minimal structure while still being able to readily vary flake thickness.

SUMMARY OF THE INVENTION

The invention pertains to the formation of cereal flakes, particularly visually distinct, flaked Ready-to-Eat ("R-T-E") cereal products with varied texture and thickness produced by forming a cereal dough within a cooker extruder and forcing the same through an extrusion die assembly including at least one die port establishing various spaced openings to create a plurality of dough streams which are merged in a convergence zone prior to reaching a die outlet. Directly at the die outlet, a resulting dough extrudate is sliced by a cutter unit to form dough discs which curl and form cereal flakes toying varying textures defined, at least in part, by distinct sets of surface bumps and then are dried and cooled. The number and configuration of the bumps can be altered by changing the number, shape and/or position of the various spaced openings of the die assembly, while the thicknesses of the resulting cereal flakes can be varied by just altering an operational speed of the cutter unit.

Additional objects, features and advantages of the invention will become more readily apparent from the following detailed description of the invention wherein like reference numeral refer to corresponding parts in the several views.

DETAILED DESCRIPTION OF THE INVENTION

Figure 1:
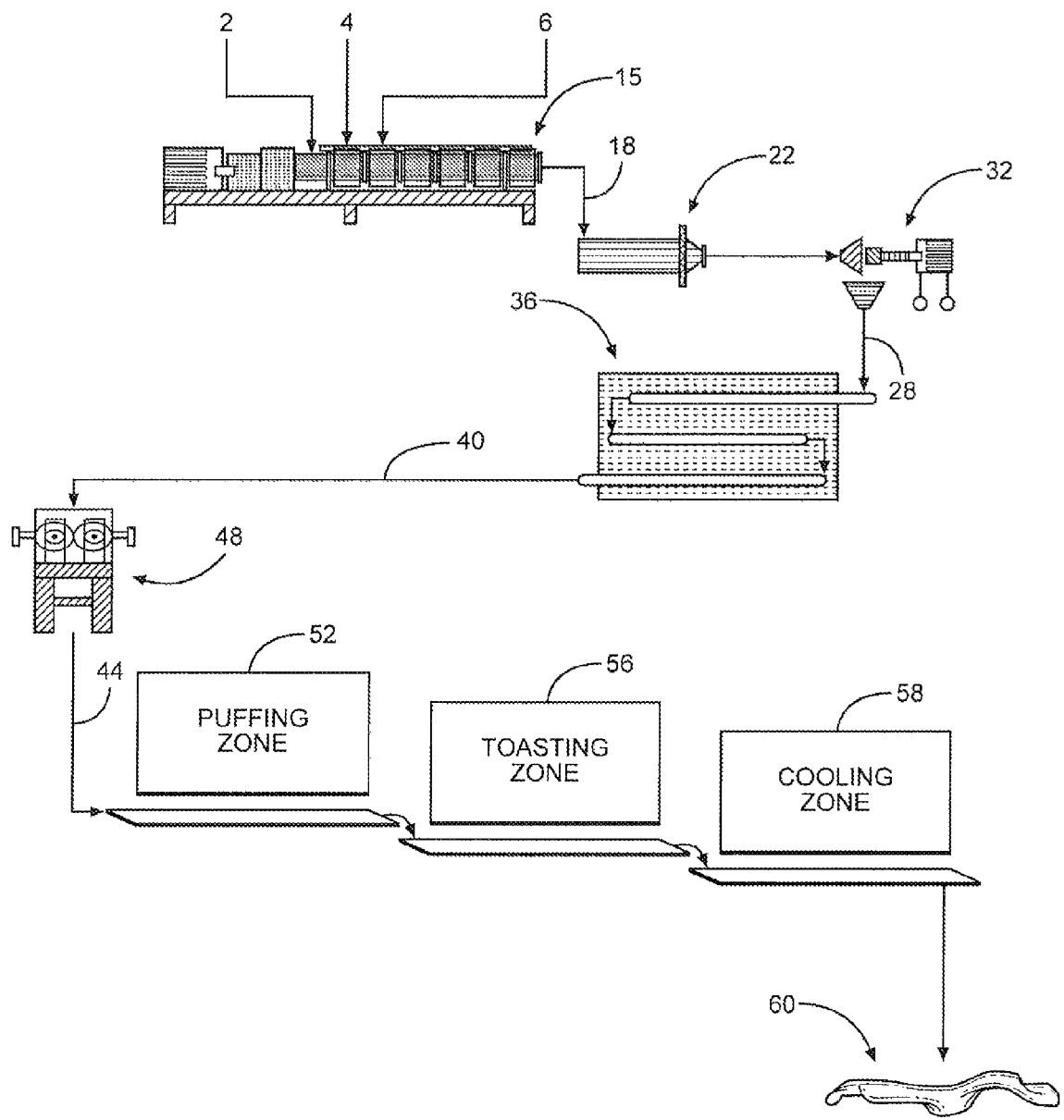
FIG. 1 schematically illustrates a flow process employed in connection with the making of cereal flakes in accordance with a known prior art arrangement.

The invention relates to an apparatus and a method for making flaked ready-to-eat (R-T-E) cereal products, along with a uniquely structured cereal flake produced thereby. More specifically, with initial reference to FIG. 2, the apparatus of the invention is generally indicated at 75. As shown, apparatus 75 includes a cooker extruder 78 into which various cereal ingredients 81-83 are supplied to form a cooked cereal dough. At this point, it should be noted that cereal ingredients 81-83 may take the form of a wide range of cereal components suitable for cooking and extrusion. By way of example, ingredient 81 constitutes a dry, processed starchy cereal ingredient, 82 constitutes a syrup and ingredient 83 constitutes water. The cereal ingredient 81 can be formed with appropriately sized particles of whole grains supplied by any of the major cereal grains including wheat, corn (maize), oats, barley, rye, rice, and mixtures thereof. In one form, the cereal ingredient 81 has only fine particles so as to constitute a cereal flour. The cereal ingredient 81 can comprise from about 40 to 99% (dry basis) of the cooked cereal dough. Better results in terms of organoleptic attributes and reductions in R-T-E cereal piece frangibility are obtained when the cereal ingredient(s) comprises about 75 to 95% of the cooked cereal dough composition. The dry ingredients can also include various minor ingredients or additives, such as sugar(s), salt and mineral salts, e.g., trisodium phosphate, and starches which can conveniently be pre-blended with ingredient 81. Ingredient 82 can actually be constituted by various liquid ingredients, such as corn (maize) or malt syrups or the like. The amount of moisture from ingredients 82 and 83 will depend on various factors, including the particular cereal ingredients, cooking temperature and working techniques employed. The moisture content of the cooked cereal dough typically ranges from about 20-30% before exiting cooker extruder 78. If desired, the cereal dough can additionally comprise about 0.1 to about 20% (dry weight) by weight sugar(s) or, synonymously herein, nutritive carbohydrate sweetening agents, particularly about 0.5% to 5%. Such materials are also well known in the R-T-E cereal art. Useful herein as the sugar component is sucrose. However, the sugar (s) component can additionally comprise conventional fructose, maltose, dextrose, honey, fruit juice solids, brown sugar, and the like. In addition to providing desirable sweetness, the sugar component additionally beneficially affects the cereal color and texture. Conveniently, the sweeteners can be added in with the starchy ingredient 81 or the syrup ingredient 82.

If desired, the cereal dough composition can additionally include a variety of materials designed to improve the aesthetic, organoleptic or nutritional qualities of the cereal. These adjuvant materials can include vitamin and/or mineral, fortification, colors, flavors, high potency sweetener(s), and mixtures thereof. The precise ingredient concentration in the cereal composition can certainly vary. Generally, however, such materials can each comprise about 0.01% to about 2% dry weight of the cereal composition. One especially useful material is common salt.

Although not shown, cooker extruder 78 can be defined by an Archimedes-type single or twin screw extruder which is driven by a motor 86 linked through a communication line 88 to a CPU 90. In a particular form, the screw extruder is equipped with a screw configuration designed to minimize imparting shear to the cooked cereal mixture. Both single and twin screw extruders are widely known in the art and suitable for the control of shear. As will become more fully evident below, the use of cooker extruder 78 has the advantage of enabling a continuous process. When taken in conjunction with other aspects of the invention, an overall minimization of manufacturing components and required space is achieved. In addition, the use of a continuous process can have advantages with respect to processing of large volumes, as well as lowering costs for larger volume production.

Figure 2:
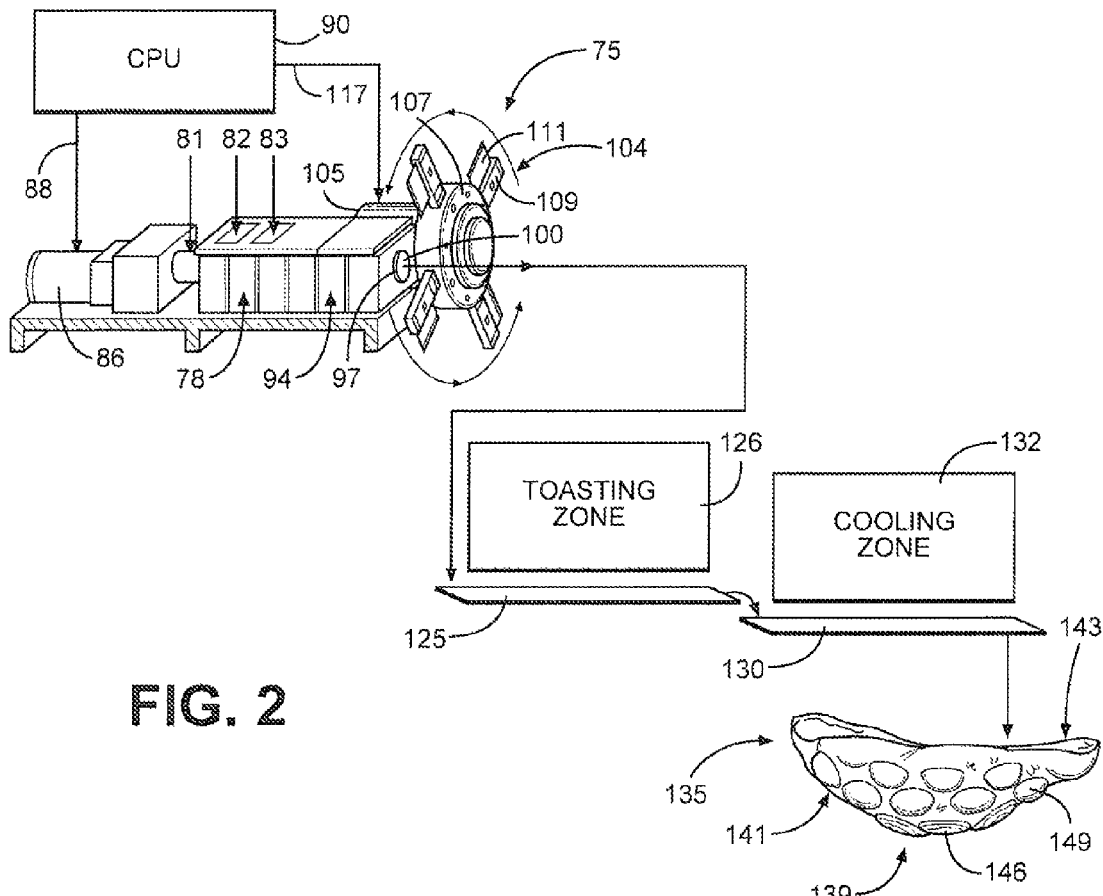
FIG. 2 is a schematic of a flow process employed in accordance with the invention to make cereal flakes.

Apparatus 75 also includes a cold forming unit 94 having an outlet 97 at which is mounted an extrusion die 100. At this point, although cooker extruder 78 and cold forming unit 94 are described as separate components of apparatus 75, it should be recognized that cooker extruder 78 and cold forming unit 94 can be integrated so as to define a single unit as represented in FIG. 2. Mounted directly adjacent cold forming unit 94 is a cutter unit 104 including a hub 107 which rotatably supports a plurality of cutter arms 109 having secured thereto respective blades 111. Cutter unit 104 includes a motor 105 for driving rotatable cutter arms 109, with motor 105 being linked through a communication line 117 to CPU 90. Certainly, various types and configurations for cutter unit 104 can be employed. One particular embodiment employs a cutter unit having a central axis aligned with the center of extrusion die 100, i.e., the cutter unit and die 100 have a common central axis. In addition, the cutter unit has an outside diameter that is similar in size to the outside diameter of the die 100. With this arrangement, all of the blades 111 are in substantial contact with a frontal die surface at all times. At this point it should just be rioted that various types of cutter units could be employed, with one particular arrangement being set forth in more detail in U.S. Pat. No. 6,767,198 which is incorporated herein in its entirety by reference.

Figure 4:
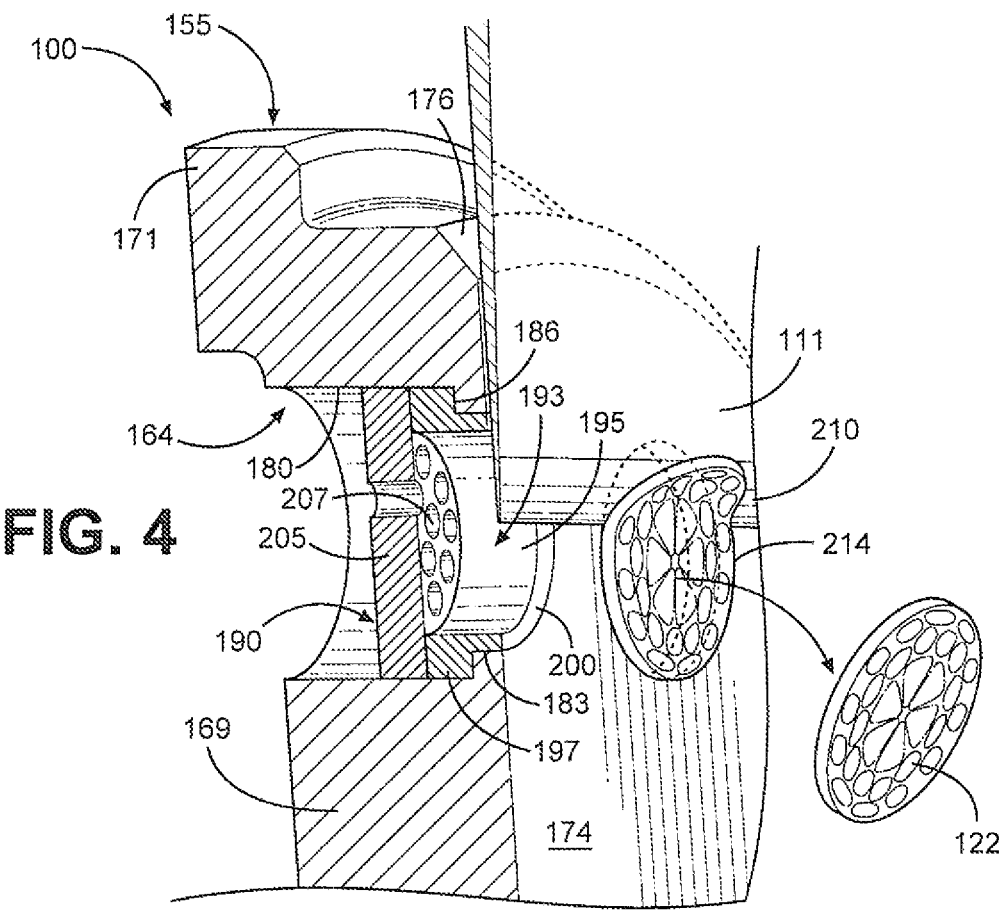
FIG. 4 is an enlarged, partial cross-sectional view of a portion of the die plate of FIG. 3, showing a stage in the formation of the cereal flakes.

In operation, ingredients 81-83 are introduced into cooker extruder 78 of apparatus 75 and blended to form a cereal mix which is cooked and mechanically worked in order to form a cereal dough. Through activation of motor 86, the cereal dough is directed through cold forming unit 94 and through extrusion die 100 in the form of an extrudate. Timed with the ejection of the extrudate, cutter arms 109 of cutter unit 104 rotate so as to slice the extrudate directly at outlet 97 to form dough discs 122 (also see FIG. 4). Dough discs 122 are transferred by a conveyor 125 through a drying zone 126, such as a toasting zone, and then through the same or another conveyor 130 to a cooling zone 132. Upon exiting cooling zone 132, dough discs 122 have been transformed into cereal flakes, such as that indicated at 135. By way of example, the toasting can be practiced at about 185° C. (365° F.) for about 10-30 seconds to toast the cereal flakes 135. The toasted flakes are dried to about 25% moisture. Cooling zone 132 can be used to establish a temperature of about 21-32° C. (70-90° F.) to arrest the toasting and to bring the toasted flakes to near ambient temperatures.

As shown in FIG. 2, each cereal flake 135 includes a lower body portion 139, side portions 141 and a peripheral edge portion 143. Based on being dried and cooled, cereal flake 135 is curled and, based on the particular structure of extrusion die 100 as will be discussed more fully below, cereal flake 135 is uniquely formed with a first set of bumps 146 in lower body portion 139 and a second side of spaced bumps 149 in side portions 141. The flake thickness is also highly variable across individual pieces due to the production method employed and can range from, for example, about 0.1 to about 3 mm. Moreover, the cereal flakes 135 generally have at least some degree of curl rather than being highly planar. As a result, a quantity of such flakes will have a bulk density ranging from about 270-480 g/liter (170-300 g/$100^3$ inch), particularly about 350 g/liter (220 g/$100^3$ inch). If desired, cereal flakes 135 can be fabricated into presweetened R-T-E cereals such as by the topical application of a conventional sweetener coating. In other variations, an oil topical coating optionally with salt and/or flavors is applied to form finished dried snack products. In still another variation, the topical coating can additionally include particulates to provide added visual appeal. Finally, the finished dried R-T-E cereal can be packaged and distributed in conventional form.

Figure 3:
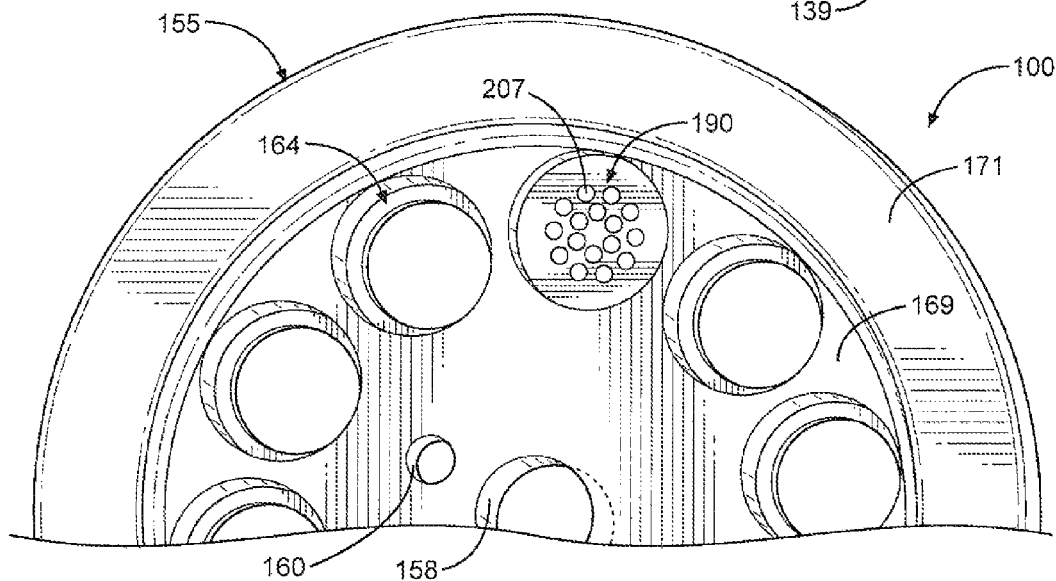
FIG. 3 is a partial perspective view of a die plate employed in making cereal flakes in accordance with the flow process of FIG. 2.

FIG. 3 illustrates a particular configuration for extrusion die 100. As shown, extrusion die 100 includes a die head 155 having a central opening 158 and one or more adjacent apertures 160, with opening 158 and aperture 160 being utilized for mounting purposes, including a distribution cone (not shown) and potentially an in-line cutter unit 104. More importantly, die head 155 is provided with a plurality of spaced extrudate ports 164. More specifically, with reference to both FIGS. 3 and 4, die head 155 includes a main body 169 which leads to a peripheral flange portion 171. Main body 169 includes a substantially planar front surface 174 which is formed with an outer beveled edge 176. Each of the plurality of extrudate ports 164 is formed within main body 169 and includes a first diametric portion 180 which leads to a second, reduced diametric portion 183. With this arrangement, an internal ledge 186 is defined between first and second diametric portions 180 and 183.

In each of the plurality of extrudate ports 164, extrusion die 100 receives a die insert assembly 190. Although die insert assembly 190 could be formed as a single piece, in accordance with one form of the invention, die insert assembly 190 includes a die sleeve 193 defined by a substantially smooth, cylindrical main body 195 which defines a die convergence zone from which extends a peripheral flange 197. Die sleeve 193 is inserted into a respective one of the plurality of extrudate ports 164 such that peripheral flange 197 abuts internal ledge 186 while an outermost exposed surface 200 of die sleeve 193 is substantially flush with front surface 174. Upstream of die sleeve 193 is a breaker plate 205 formed with a plurality of geometric openings 207. Each of the plurality of geometric openings 207 actually extend entirely through breaker plate 205 and are exposed to the convergence zone. That is, an outermost radial portion (not separately labeled) of breaker plate 205 abuts peripheral flange 197 and each of the plurality of geometric openings 207 are arrange radially inward of this abutment region.

With this arrangement, the formed, homogeneous blended cereal dough is directed to extrusion die 100 wherein a portion of the cooked cereal dough enters a respective one of the plurality of extrudate ports 164, and then is divided into a plurality of extrudate streams upon being forced through the plurality of geometric openings 207. Thereafter, the plurality of extrudate streams are merged and fused within the convergence zone defined by main cylindrical body 195 to form a single extrudate stream which exits extrusion die 100 with an outer surface that is substantially parallel to front surface 174, while also being of uniform thickness. At the same time, CPU 90 controls the operation of motor 115 in order to rotate cutter arms 109 such that a cutting edge 210 of a respective blade 111 slices the emerging extrudate 214 into dough discs 122 having a uniform thickness.

Figure 5:
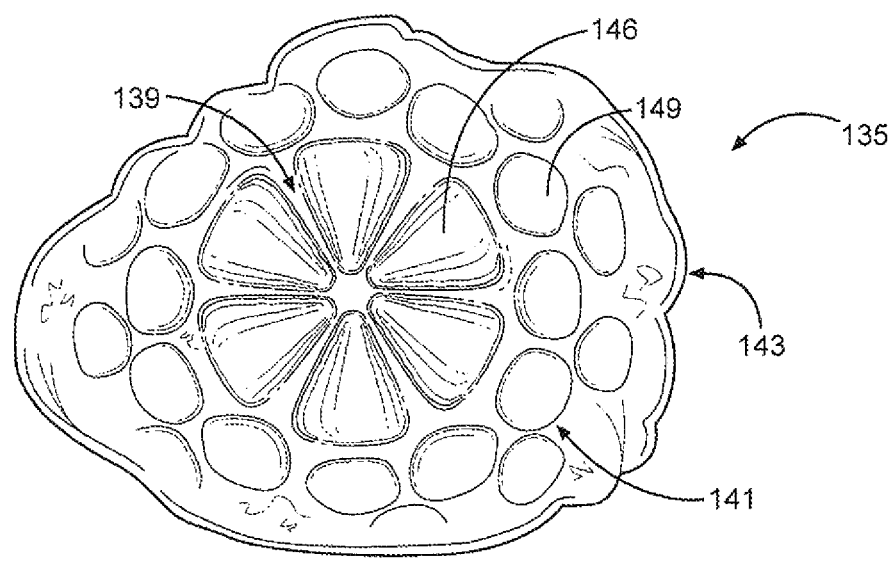
FIG. 5 is an enlarged view of a cereal flake constructed in accordance with the invention.

With this overall arrangement, it should be readily apparent that the additional structures previously employed in the prior art to include at least a pelletizer, pellet dryer and flaking roll, such as described with respect to FIG. 1 and set forth in U.S. Pat. No. 7,413,760 which is incorporated herein in its entirety by reference, are avoided. In addition to advantageously reducing the number of stages and structure needed to form cereal flakes, apparatus 75 of the invention establishes uniquely configured cereal flakes 135 as represented in FIGS. 2 and 5. That is, through the use of the plurality of geometric openings 207 in breaker plate 205, a controlled flow of cereal dough is established which emerges from extrusion die 100 with a face that is uniform, i.e., neither substantially concave or convex, until cut to create a cereal flake 135 having varying density regions throughout its body which are interconnected. Due to the fusing of dough after breaker plate 205, in the formation of each cereal flake 135, bumps are formed in these regions and the bumps can take various configurations. In particular, it has been surprisingly found that, in lower body portion 139, the first set of bumps 146 establish a generally flower-like pattern through interconnected, generally trapezoidal-shaped undulations as clearly shown in FIG. 5. On the other hand, in side portions 141, the second set of bumps 149 are generally more circular, oval or oblong. Certainly, the particular configurations of first and second sets of bumps 146 and 149 can be varied by altering the geometric shapes of the plurality of geometric openings 207, such that the circular configuration merely represents one embodiment of the invention.

With this arrangement, it should be advantageously apparent that the rate at which the extrudate 214 exits extrusion die 100 and the speed at which cutter unit 104 is operated could be used to determine the thickness of each flake disc 122. However, the timing employed in cooker extruder 78 and cold forming unit 94 in the formation of the cereal dough is desirably maintained substantially constant for dough consistency. Therefore, in accordance with the invention, the thickness of each cereal flake is readily varied by just altering the speed of operation of motor 115 through CPU 90. For exemplary purposes, the dough discs 122 formed can have a thickness ranging from say 375-750 micrometers ("μm") (≈0.0175-0.030 inch). Extrusion die 100 is shown with various extrudate ports 164, the number of which can vary from one to many more depending on the size of front surface 174. Most importantly, it should be understood that each extrudate port 164 receives a corresponding die insert assembly 190 and each die insert assembly 190 creates a separate dough disc 122. As shown, a single action of one cutting arm 109 can produce numerous dough discs 122 and, correspondingly, numerous cereal flakes 135. In addition, the number, size and/or geometric shape of each opening 207 can be varied to establish another uniquely configured cereal flake 135. For instance, one other particularly advantageous shape for openings 207 is oval. The finished cereal flakes 135 would typically be packaged in a sealed bag which is arranged inside an outer carton. In any case, the cereal flakes 135 can be packaged alone or in combination with other cereal particulates, such as dried fruit, marbits, nuts, clusters of agglomerated/grains, granola and/or the like. The cereal flakes 135 are also suitable as an additive to a packaged snack mix including other cereal pieces, pretzels, dried fruit, chocolate pieces, nuts and the like.

With the above in mind, it should be readily apparent that the invention has been described with reference to certain embodiments of the invention and that various changes and/or modifications can be made to the invention without departing from the spirit thereof. Instead, the invention is only intended to be limited by the scope of the following claims.

We claim:

1. A method for preparing a flaked cereal product comprising:
    forming a workable cooked cereal dough;
    directing the cereal dough through a plurality of spaced geometric openings establishing a plurality of dough streams;
    merging the plurality of streams to form a single dough extrudate;
    slicing the dough extrudate at a predetermined thickness to create individual cereal dough discs;
    drying the cereal dough discs, forming individual, curled cereal flakes; and
    altering a speed of operation of a cutting device used in slicing the dough extrudate to vary a degree of curl of the individual, curled cereal flakes.

2. The method of claim 1, wherein directing the cereal dough through the plurality of spaced geometric openings constitutes sending the cereal dough through an extrusion die and slicing the dough extrudate includes cutting the dough extrudate immediately upon exiting the extrusion die.

3. The method of claim 1, wherein forming the individual, curled cereal flakes includes creating a flake body having a plurality of spaced, interconnected surface bumps.

4. The method of claim 1, further comprising: cold forming the cereal dough prior to slicing the dough extrudate.

5. The method of claim 4, wherein forming the workable cooked cereal dough includes receiving, working and cooking a plurality of cereal dough ingredients in a single unit which performs both the cooking and cold forming.

6. The method of claim 2, wherein sending the cereal dough through the extrusion die includes sending the cereal dough through a first portion of the extrusion die, with the first portion having the plurality of spaced geometric openings, and then through a second section of the extrusion die, with the second section having a convergence zone in which the merging of the plurality of streams is performed.

7. The method of claim 6, wherein the cutting of the dough extrudate is performed by rotating a cutter unit juxtapose the extrusion die.

8. The method of claim 6, wherein the cereal dough is directed through a breaker plate of the extrusion die upstream of the convergence zone.

9. The method of claim 1, wherein directing the cereal dough through the plurality of spaced geometric openings includes directing the cereal dough through spaced, circular openings.

10. The method of claim 1, wherein altering the speed of operation of the cutting device also varies a thickness of the individual, curled cereal flakes.

11. The method of claim 10, wherein the thickness is in the range of about 0.1 to 3 mm.

12. A method for preparing a flaked cereal product comprising:
- forming a workable cooked cereal dough;
- directing the cereal dough through a plurality of spaced geometric openings establishing a plurality of dough streams, wherein directing the cereal dough through the plurality of spaced geometric openings constitutes sending the cereal dough through an extrusion die formed with a plurality of spaced extrusion ports, with each of the extrusion ports having established therein a respective set of the plurality of spaced geometric openings;
- merging the plurality of streams to form a single dough extrudate;
- slicing the dough extrudate at a predetermined thickness to create individual cereal dough discs; and
- drying the cereal dough discs, forming individual, curled cereal flakes having thicknesses in a range from about 0.1 to 3 mm and varying density regions.

13. The method of claim 12, further comprising: varying a degree of curl of the individual, curled cereal flakes.

14. The method of claim 13, further comprising: altering a speed of operation of a cutting device used in slicing the dough extrudate to vary a degree of curl of the individual, curled cereal flakes.

15. The method of claim 14, wherein altering the speed of operation of the cutting device also varies a thickness of the individual, curled cereal flakes.

16. A method for preparing a flaked cereal product comprising:
- forming a workable cooked cereal dough;
- directing the cereal dough through a plurality of spaced geometric openings establishing a plurality of dough streams;
- merging the plurality of streams to form a single dough extrudate;
- slicing the dough extrudate at a predetermined thickness to create individual cereal dough discs; and
- drying the cereal dough discs, forming individual, curled cereal flakes, wherein forming the individual, curled cereal flakes includes creating each flake to have a curled flake body with a plurality of spaced, interconnected surface bumps and creating the curled flake body of each flake to include a lower body portion, side portions and a peripheral edge portion, with the plurality of spaced, interconnected surface bumps including a first set of bumps in the lower body portion and a second set of bumps in the side portions, with the first set of bumps being geometrically shaped different from the second set of bumps and each flake having varying density regions.

17. The method of claim 16, wherein creating the curled flake body includes forming each of the first set of bumps to have a substantially trapezoidal-shaped configuration.

18. The method of claim 16, further comprising: altering a speed of operation of a cutting device used in slicing the dough extrudate to vary a degree of curl of the individual, curled cereal flakes.

19. The method of claim 18, wherein altering the speed of operation of the cutting device also varies a thickness of the individual, curled cereal flakes.

20. The method of claim 19, wherein the thickness is in the range of about 0.1 to 3 mm.

* * * * *